United States Patent
Mueck et al.

(10) Patent No.: US 12,193,041 B2
(45) Date of Patent: Jan. 7, 2025

(54) SYSTEMS, DEVICES, AND METHODS FOR PROTECTING V2X COMMUNICATIONS FROM NEAR-BAND INTERFERENCE

(71) Applicant: Intel Corporation, Santa Clara, CA (US)

(72) Inventors: Markus Dominik Mueck, Unterhaching (DE); Michael Faerber, Wolfratshausen (DE)

(73) Assignee: INTEL CORPORATION, Santa Clara, CA (US)

(*) Notice: Subject to any disclaimer, the term of this patent is extended or adjusted under 35 U.S.C. 154(b) by 372 days.

(21) Appl. No.: 17/688,934

(22) Filed: Mar. 8, 2022

(65) Prior Publication Data

US 2022/0408447 A1  Dec. 22, 2022

(30) Foreign Application Priority Data

Jun. 22, 2021 (EP) .................................. 21180798

(51) Int. Cl.
*H04W 72/541* (2023.01)
*H04W 4/40* (2018.01)
(Continued)

(52) U.S. Cl.
CPC ........... *H04W 72/541* (2023.01); *H04W 4/40* (2018.02); *H04W 64/003* (2013.01); *H04W 72/0453* (2013.01)

(58) Field of Classification Search
CPC . H04W 4/40; H04W 64/003; H04W 72/0453; H04W 72/1215; H04W 72/54;
(Continued)

(56) References Cited

U.S. PATENT DOCUMENTS 9,182,232 B2 * 11/2015 Skaaksrud .......... G08B 21/0269
10,524,280 B1 * 12/2019 Klomsdorf .......... H04W 72/542
(Continued)

FOREIGN PATENT DOCUMENTS

EP        3402249 A1   11/2018
WO   2020191039 A1    9/2020

OTHER PUBLICATIONS

European Search Report issued for the corresponding European patent application No. 21 18 0798, dated Dec. 17, 2021, 9 pages (for informational purposes only).

*Primary Examiner* — Dung B Huynh
(74) *Attorney, Agent, or Firm* — VIERING, JENTSCHURA & PARTNER mbB

(57) ABSTRACT

The disclosure relates to systems, methods, and devices for protecting Vehicle-to-Everything (V2X) communications (also known as intelligent transport systems (ITS) communications) from spurious emissions of nearby wireless devices operating in near-band or adjacent frequency bands. The system detects radio signals of a nearby ITS communication device, determines its radio communication parameters, and determines an interference condition based on whether the wireless device may interfere with the ITS communication device. The system also requests a change, based on the interference condition, in the radio subsystem communication parameters of the wireless device. The system also determines a geographic location of the wireless device, and, based on whether the requested change complies with a regulatory requirement of the determined geographic location, implements the requested change.

19 Claims, 6 Drawing Sheets

(51) Int. Cl.
*H04W 64/00* (2009.01)
*H04W 72/0453* (2023.01)

(58) Field of Classification Search
CPC . H04W 72/541; H04W 52/367; H04W 16/14; H04W 24/02; H04W 48/04; H04W 72/04; H04W 72/56; H04W 4/70
See application file for complete search history.

(56) References Cited

U.S. PATENT DOCUMENTS

| | | | | |
|---|---|---|---|---|
| 10,582,459 | B2 * | 3/2020 | Gulati | H04W 52/283 |
| 10,727,993 | B2 * | 7/2020 | Lim | H04B 7/024 |
| 10,785,731 | B2 * | 9/2020 | Wu | H04W 52/30 |
| 10,924,230 | B1 * | 2/2021 | Marupaduga | H04L 5/0073 |
| 11,678,161 | B2 * | 6/2023 | Lee | H04W 4/029 370/329 |
| 11,974,301 | B2 * | 4/2024 | Ruder | H04W 4/40 |
| 2005/0215197 | A1 * | 9/2005 | Chen | H04W 28/06 455/41.2 |
| 2005/0286509 | A1 * | 12/2005 | Iwamura | H04H 20/77 370/381 |
| 2007/0183338 | A1 * | 8/2007 | Singh | H04W 16/14 370/252 |
| 2009/0189780 | A1 * | 7/2009 | Machida | H04W 84/20 340/901 |
| 2012/0236746 | A1 * | 9/2012 | Nagai | H04W 4/46 370/252 |
| 2012/0263118 | A1 * | 10/2012 | Love | H04W 72/1215 370/329 |
| 2013/0343288 | A1 * | 12/2013 | Ratasuk | H04W 52/38 370/329 |
| 2014/0064199 | A1 * | 3/2014 | Pan | H04W 72/02 370/329 |
| 2014/0256316 | A1 * | 9/2014 | Lee | H04W 48/16 455/434 |
| 2015/0036514 | A1 * | 2/2015 | Zhu | H04W 52/18 370/252 |
| 2015/0063148 | A1 * | 3/2015 | Sadek | H04W 24/08 370/252 |
| 2015/0163043 | A1 * | 6/2015 | Lee | H04L 5/0073 370/336 |
| 2016/0248464 | A1 * | 8/2016 | Alavi | H04B 15/02 |
| 2016/0337007 | A1 * | 11/2016 | Seyedmehdi | H04B 7/0413 |
| 2017/0188391 | A1 * | 6/2017 | Rajagopal | H04W 74/0816 |
| 2017/0215123 | A1 * | 7/2017 | Miranda d'Orey | H04W 4/46 |
| 2017/0366289 | A1 * | 12/2017 | Kang | H04J 11/00 |
| 2018/0242190 | A1 * | 8/2018 | Khoryaev | H04W 28/0284 |
| 2018/0288620 | A1 * | 10/2018 | Jayawickrama | H04W 72/0453 |
| 2018/0324565 | A1 * | 11/2018 | Belagal Math | H04W 4/046 |
| 2018/0365909 | A1 * | 12/2018 | Cheng | H04Q 9/00 |
| 2019/0007889 | A1 * | 1/2019 | Jayawickrama | H04W 48/04 |
| 2019/0053186 | A1 * | 2/2019 | Mueck | H04W 36/0055 |
| 2019/0174506 | A1 * | 6/2019 | Willis, III | H04B 3/52 |
| 2019/0261290 | A1 * | 6/2019 | Gulati | H04W 52/267 |
| 2019/0223217 | A1 * | 7/2019 | Ljung | H04W 74/0816 |
| 2019/0281487 | A1 * | 9/2019 | Liu | H04W 24/10 |
| 2019/0281603 | A1 * | 9/2019 | Oh | H04B 17/318 |
| 2019/0349957 | A1 * | 11/2019 | Sorrentino | H04L 67/51 |
| 2019/0373609 | A1 * | 12/2019 | Kim | H04W 72/541 |
| 2019/0380146 | A1 * | 12/2019 | Smely | H04W 74/0808 |
| 2020/0077279 | A1 * | 3/2020 | Foerster | H04W 16/28 |
| 2020/0100328 | A1 * | 3/2020 | Goto | H04B 1/40 |
| 2020/0178268 | A1 * | 6/2020 | Duengen | H04W 74/004 |
| 2020/0178269 | A1 * | 6/2020 | Haas | H04W 16/14 |
| 2020/0196325 | A1 * | 6/2020 | Patil | H04W 4/12 |
| 2020/0236556 | A1 * | 7/2020 | Eckert | H04W 72/02 |
| 2020/0245355 | A1 * | 7/2020 | Mueck | H04L 27/2678 |
| 2020/0295800 | A1 * | 9/2020 | Wang | H04B 7/024 |
| 2020/0336973 | A1 * | 10/2020 | Niu | H04W 72/23 |
| 2020/0359455 | A1 * | 11/2020 | Hofmann | H04W 72/1215 |
| 2020/0367030 | A1 * | 11/2020 | Baek | H04W 80/02 |
| 2021/0014656 | A1 * | 1/2021 | Mueck | H04W 4/40 |
| 2021/0014873 | A1 * | 1/2021 | Akhtar | H04W 74/0808 |
| 2021/0160822 | A1 * | 5/2021 | Hassan | H04W 4/40 |
| 2021/0160965 | A1 * | 5/2021 | Ji | H04W 72/23 |
| 2021/0258830 | A1 * | 8/2021 | Baek | H04W 4/40 |
| 2021/0274327 | A1 * | 9/2021 | Zhao | H04L 1/1812 |
| 2021/0297314 | A1 * | 9/2021 | Stefanatos | H04J 3/14 |
| 2021/0303137 | A1 * | 9/2021 | Adenwala | H04W 4/44 |
| 2021/0345156 | A1 * | 11/2021 | Baek | H04W 4/40 |
| 2021/0385871 | A1 * | 12/2021 | Martinez | H04W 74/0816 |
| 2021/0392454 | A1 * | 12/2021 | Choi | H04L 5/0094 |
| 2021/0392545 | A1 * | 12/2021 | Ryu | H04W 28/26 |
| 2022/0039052 | A1 * | 2/2022 | Choi | G01S 13/765 |
| 2022/0046467 | A1 * | 2/2022 | Zhang | H04W 72/56 |
| 2022/0053422 | A1 * | 2/2022 | Choi | H04W 48/10 |
| 2022/0061093 | A1 * | 2/2022 | Back | H04W 74/0816 |
| 2022/0086854 | A1 * | 3/2022 | He | H04W 72/0446 |
| 2022/0095311 | A1 * | 3/2022 | Kondareddy | H04W 72/542 |
| 2022/0132524 | A1 * | 4/2022 | Mueck | H04W 4/80 |
| 2022/0150936 | A1 * | 5/2022 | Lee | H04W 52/38 |
| 2022/0182116 | A1 * | 6/2022 | Raghavan | H04B 7/0617 |
| 2022/0225110 | A1 * | 7/2022 | Patel | H04W 72/23 |
| 2022/0232525 | A1 * | 7/2022 | Lee | H04L 5/0053 |
| 2022/0240134 | A1 * | 7/2022 | Yang | H04W 72/1215 |
| 2022/0247451 | A1 * | 8/2022 | Aldana | H04W 16/14 |
| 2022/0248176 | A1 * | 8/2022 | Hwang | H04W 92/18 |
| 2022/0279582 | A1 * | 9/2022 | Choi | H04L 5/0051 |
| 2022/0287036 | A1 * | 9/2022 | Mildh | H04W 72/56 |
| 2022/0287083 | A1 * | 9/2022 | Gomes Baltar | H04W 4/40 |
| 2022/0295305 | A1 * | 9/2022 | Hwang | H04B 7/06 |
| 2022/0322439 | A1 * | 10/2022 | Baek | H04W 74/0808 |
| 2022/0326374 | A1 * | 10/2022 | Torres | G01S 7/0232 |
| 2022/0330224 | A1 * | 10/2022 | Ruder | H04W 4/40 |
| 2022/0353732 | A1 * | 11/2022 | Filippou | H04W 4/40 |
| 2022/0368489 | A1 * | 11/2022 | Grant | H04L 5/0053 |
| 2022/0383750 | A1 * | 12/2022 | Sharma Banjade | G08G 1/005 |
| 2022/0400386 | A1 * | 12/2022 | Furuichi | H04W 56/001 |
| 2023/0007483 | A1 * | 1/2023 | Mueck | G06Q 50/265 |
| 2023/0033028 | A1 * | 2/2023 | Wang | H04B 7/0452 |
| 2023/0059750 | A1 * | 2/2023 | Beale | H04L 1/0026 |
| 2023/0066874 | A1 * | 3/2023 | Zhou | H04W 76/19 |
| 2023/0067689 | A1 * | 3/2023 | Hwang | H04W 24/10 |
| 2023/0070113 | A1 * | 3/2023 | Kang | H04W 76/14 |
| 2023/0127945 | A1 * | 4/2023 | Ko | G01S 5/0236 455/456.1 |
| 2023/0188960 | A1 * | 6/2023 | Kumari | H04B 17/3912 370/310 |
| 2023/0199849 | A1 * | 6/2023 | Khoryaev | H04W 28/0284 370/329 |
| 2023/0292243 | A1 * | 9/2023 | Mueck | H04W 52/0216 |
| 2023/0327723 | A1 * | 10/2023 | Pan | H04W 56/0015 370/329 |
| 2023/0403698 | A1 * | 12/2023 | Wang | H04W 72/0453 |
| 2024/0031975 | A1 * | 1/2024 | Baek | G01S 5/0236 |
| 2024/0032076 | A1 * | 1/2024 | Li | H04W 72/40 |
| 2024/0032132 | A1 * | 1/2024 | Guo | H04W 16/14 |
| 2024/0057027 | A1 * | 2/2024 | Edge | H04W 76/14 |
| 2024/0129765 | A1 * | 4/2024 | Dimou | H04W 24/08 |
| 2024/0129861 | A1 * | 4/2024 | Mueck | H04B 15/00 |
| 2024/0137180 | A1 * | 4/2024 | Manolakos | H04L 5/0051 |
| 2024/0163955 | A1 * | 5/2024 | Manolakos | H04W 64/006 |

* cited by examiner

SYSTEMS, DEVICES, AND METHODS FOR PROTECTING V2X COMMUNICATIONS FROM NEAR-BAND INTERFERENCE

RELATED APPLICATION(S)

This application claims priority to European Patent Application No. EP21180798, filed on Jun. 22, 2021, the contents of which are fully incorporated herein by reference.

TECHNICAL FIELD

The disclosure relates to wireless devices (e.g., Wi-Fi Access Points) and Vehicle-to-Everything (V2X) communications (also known as intelligent transport systems (ITS) communications), and in particular, systems, devices, and methods for protecting V2X communications from spurious interference that may be caused by wireless devices operating an adjacent or nearby frequency band.

BACKGROUND

Today's vehicles, and in particular, autonomous or partially autonomous vehicles, rely on an extensive sensor network to detect information about the vehicles' surroundings. Part of that sensor network may include sensors/objects that are nearby the vehicle and the vehicle may communicate with those sensors/objects. In particular, vehicle-to-everything (V2X) (also known as connected-vehicle-to-everything) communications allows vehicles to communicate with static and active objects that may be in the traffic environment. V2X communications are also known as intelligent transport systems (ITS) communications, and encompass communications among vehicles as well as between vehicles and other objects. For example, vehicle-to-vehicle (V2V) communications allows vehicles to communicate with one another, and vehicle-to-infrastructure (V2I) communications allows vehicles to communicate with street lights, buildings, etc., and in both cases, the shared information may be used to estimate the constellation of objects in the traffic environment and react safely.

Robust and reliable V2X communications are important so that vehicles may safely utilize V2X communications to learn and provide information about the surrounding traffic environment. If V2X communications experience interference from other communications devices, reliability of the V2X system may be impaired. As one example, Wi-Fi Access Points (APs) may operate in frequency bands nearby the V2X communications bands, resulting in spurious emissions in the V2X communication band. As a result, wireless communications of such devices may interfere with V2X communications. In addition, different geographic locations may operate V2X communications in different frequency bands and according to different communication standards. Moreover, geographic locations may impose restrictions on V2X communications or on other wireless communications (such as communications with Wi-Fi access points) that may operate near V2X devices in order to comply with the regulatory requirements of the particular region.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary aspects of the disclosure are described with reference to the following drawings, in which.

DESCRIPTION

Figure 1:
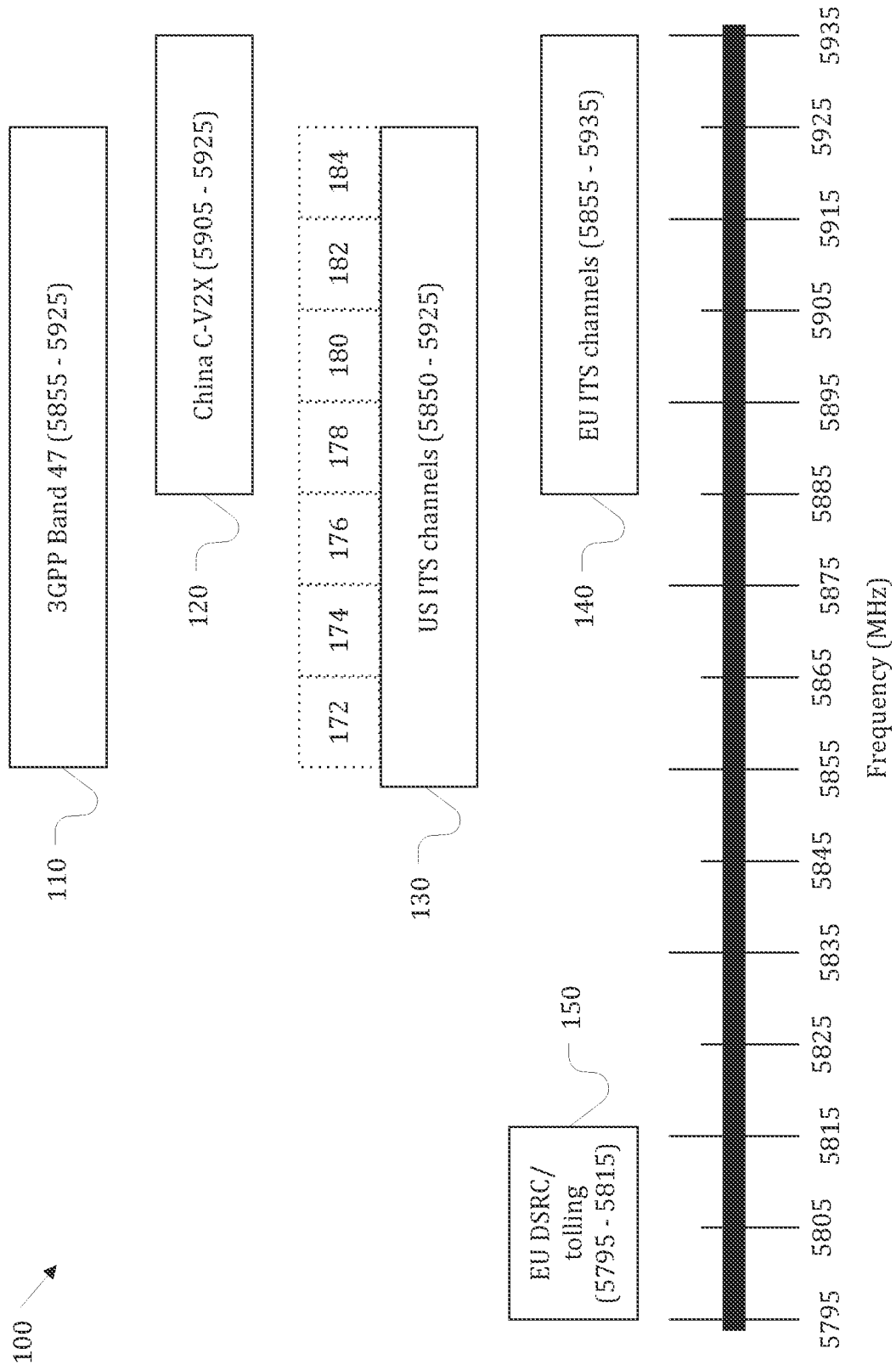
FIG. 1 shows an exemplary assignment of frequency spectrum to various wireless systems in approximately the 5.795 GHz to 5.935 GHz frequency range.

The following detailed description refers to the accompanying drawings that show, by way of illustration, exemplary details and features.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "vehicle" may be understood to include any type of driven object. By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, or a rocket, among others.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), IEEE 802.11bd based systems, etc.

Aspects described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (allocated, for example, in the US (FCC Part 15)), 863-868.6 MHz (allocated, for example, in the European Union (ETSI EN 300 220)), 915.9-929.7 MHz (allocated, for example, in Japan), 917-923.5 MHz (allocated, for example, in South Korea), 755-779 MHz and 779-787 MHz (allocated, for example, in China), 790-960 MHz, 1710-2025 MHz, 2110-2200 MHz, 2300-2400 MHz, 2.4-2.4835 GHz (e.g., ISM band with global availability, used by Wi-Fi 11b/g/n/ax and by Bluetooth), 2500-2690 MHz, 698-790 MHz, 610-790 MHz, 3400-3600 MHz, 3400-3800 MHz, 3800-4200 MHz, 3.55-3.7 GHz (allocated, for example, in the US for Citizen Broadband Radio Service), 5.15-5.25 GHz and 5.25-5.35 GHz and 5.47-5.725 GHz and 5.725-5.85 GHz bands (allocated, for example, in the US (FCC part 15), including four U-NII bands, for a total of 500 MHz of spectrum), 5.725-5.875 GHz (allocated, for example, in the EU (ETSI EN 301 893)), 5.47-5.65 GHz (allocated, for example, in South Korea, 5925-7125 MHz and 5925-6425 MHz band (under consideration in the US and the EU, respectively). Next generation Wi-Fi systems are expected to include operating bands the 6 GHz spectrum, IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (in the US FCC part 15 allocates a total of 14 GHz of spectrum, while the EU, ETSI EN 302 567 and ETSI EN 301 217-2 (for fixed P2P) allocates a total of 9 GHz of spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

The apparatuses and methods described herein may be implemented using a hierarchical architecture, e.g., by introducing a hierarchical prioritization of usage for different types of users (e.g., low/medium/high priority, etc.), based on a prioritized access to the spectrum (e.g. with highest priority given to tier-1 users, followed by tier-2, then tier-3, etc.).

The apparatuses and methods described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.].

Some of the features in this document are defined for the network side, such as Access Points, eNodeBs, New Radio (NR) or next generation Node Bs (gNodeB or gNB—note that this term is typically used in the context of 3GPP fifth generation (5G) communication systems), etc. Still, a User Equipment (UE) may take this role as well and act as an Access Points, eNodeBs, gNodeBs, etc. In other words, some or all features defined for network equipment may be implemented by a UE.

FIG. 1 shows exemplary frequency allocations in the 5.795 Gz to 5.935 Gz range for various wireless communications systems in various regions. The X-axis of FIG. 1 plots frequency in MHz, and the rectangular boxes show the frequency ranges allocated to certain frequency bands for the corresponding wireless communication system. The plotted frequency bands are merely exemplary, and they are not meant to be exhaustive of all frequency bands that have been allocated in the plotted frequency range for all regions. For example, frequency band 150 occupies 5.795 to 5.815 GHz and is allocated by the European Union (EU) for communications within the EU associated with dedicated short-range communications (DSRC) tolling. As another example, frequency band 140 occupies 5.855 to 5.935 GHz and is allocated by the European Union (EU) for intelligent transport (ITS) communications within the EU. In the United States, for example, frequency band 130 occupies channels in the 5.850 to 5.925 GHz range, which have been assigned to ITS communications in the United States.

For reference, the various channel numbers have been placed above frequency band 130 to show how the channels may occupy a given frequency band for ITS communications. As shown immediately above frequency band 130, channels 172, 174, 176, 178, 180, 182, and 184 occupy frequency band 130 assigned to ITS communications in the United States, for example. In China, for example, frequency band 120 is assigned to the C-V2X communication band for ITS communications in China and occupies frequencies from 5.905 to 5.925 GHz. In another example, frequency band 110 shows the frequencies allocated to the Third Generation Partnership Project (3GPP) Long Term Evolution (LTE) Band 47 (e.g., New Radio (NR) unlicensed band) that occupies channels in the 5.855 to 5.925 GHz frequency range. As can be seen, different geographical locations may have allocated the frequencies differently within the 5.795 Gz to 5.935 Gz frequency range. As a result, the regulatory requirements for communications in a given ITS frequency band (and/or nearby frequency bands) may be different depending on the geographic location in which the communications occur.

With these various frequency bands for ITS communications in mind, it should also be understood that operating wireless devices in frequency bands that are adjacent to or nearby the frequency band used for ITS communications could cause interference with the ITS communication. Mobile communications devices (e.g., mobile WiFi access points) may be particularly problematic because they may change from operating in one geographic region to operating a another geographic region such that the previous settings for communication parameters of the wireless device in the previous location may cause increased interference on ITS communications in the in the new location. As a result, the wireless device may need to update its communications parameters to respect local regulatory requirements and the particular ITS frequency band used for ITS communications in the current operating location.

One approach for protecting ITS communications is for the ITS communications to use very robust modulation and coding schemes (MSC). Robust MSCs provide some protection against spurious emissions from out of band interference (e.g., a WiFi access point operating in a near-band or adjacent frequency band). This approach, however, may neither be ideal nor sufficient. First, very robust MSC schemes may dramatically reduce the overall capacity and spectral efficiency for ITS communications. Second, although robust MSC measures may reduce the effects of out-of-band interference, this method alone is not necessarily effective enough to provide safe and reliable ITS communications amid high levels of out-of-band interference. Wideband noise caused by out-of-band interference, for example, may still desensitize ITS receivers and impair receiver sensitivity, leading to a reduced functional range for ITS communications.

The systems, devices, and methods disclosed herein provide improved protection for ITS communications from nearby wireless devices operating in near-band or adjacent frequency bands. First, wireless parameters for the wireless device (e.g., for the WiFi access point) may be configured to meet regulations that depend on the geographic location in which the system is operating. Second, the wireless device (e.g., the WiFi access point) may detect the presence of nearby ITS communications equipment operating in a near-band or adjacent frequency band and modify its communications parameters (e.g., the communication parameters of the WiFi access point) to reduce its interference with the wireless signals of the ITS communications system. In this manner, the wireless device may both comply with regulatory requirements of the region and reduce interference on ITS communications that may be operating within range of the wireless device. Accordingly, the nearby V2X equipment and ITS communications in near-band or adjacent frequency bands (e.g., around 5.9 GHz) may be able to operate in MCS modes with higher throughput and may be able to take advantage of the full available bandwidth for ITS communications in the region.

As will be discussed in more detail below, the disclosed system may introduce a control entity for the wireless device that controls parameter selection (and their values) for the wireless transceiver of the wireless device (e.g., a WiFi access point). The control entity for the wireless device may limit physical layer configurations of the wireless device if the existence of ITS communications are detected nearby in near-band or adjacent frequency bands. The control entity may, for example, enforce policies or parameters that may reduce interference levels of the wireless device on ITS communications by causing the wireless transceiver to switch to a specific frequency channel, avoid a particular frequency channel, reduce output power level of transmitted wireless signals, stop transmitting at specified time periods, cease communications while in close proximity to detected ITS communications, etc.

In addition, the control entity may differentiate between those wireless transmission parameters that may impact nearby ITS communications (e.g., parameters that have a significant impact on out-of-band emission levels within the ITS communication band (e.g., essential parameters), such as output power level, channel (e.g., frequency) selection, activation/deactivation of dynamic frequency selection, provisioning of software components which affect lower communications layers (typically layers 1, 2, and/or 3 in the open systems interconnect (OSI) model), beamforming parameters, channel access parameters, etc. and those wireless transmission parameters that do not have a significant impact on out-of-band emission levels within the ITS communications band (e.g., non-essential parameters). It should be understood that the list of exemplary essential parameters are not restricted to the examples provided, and the categorization of a given parameter as an essential or non-essential parameter may depend on regional regulatory requirements.

The control entity may also differentiate between wireless transmission parameters that may impact regional requirements (e.g., essential parameters may also be based on regional requirements) and wireless transmission parameters that do not impact regional requirements (e.g., non-essential parameters). The control entity may allow modifications to the essential parameters, if the modifications comply with regional regulatory requirements, to reduce interference in the ITS communication band. Further, the control entity may prevent alterations to the essential parameters and/or limit selection of values for the essential parameters to values that prevent significant interference to ITS communications or to those values that will reduce interference to ITS communications. In addition, the control entity may have an expert mode in which the essential parameters may be changed, irrespective of the impact on the ITS communications band or on the regulatory requirements of the region.

It should be noted that the terms "essential parameters" and "essential requirements" as used herein are also European-specific terms used in the context of the European "Radio Equipment Directive (RED)" that introduces requirements for the joint Operation of Hardware and Software. These terms are not meant to be limiting, and in other regions (e.g., the Americas, Europe, Japan, etc.) similar concepts may apply but the terminology may be different. In particular, other regions include the United States, where the Federal Communications Commission (FCC) regulates wireless emissions, who may also request similar protection mechanisms as in the European context.

Third party software (e.g., an open source operating system) may access the control entity to make changes to the wireless transmission parameters. The control entity may use a closed manufacturer controlled entity to first validate compliance of any requested changes that may impact the essential parameters, including whether the requested change impacts regulatory requirements according to the local region and/or ITS communications.

Using output power as one example, a request may be received by the control entity to change the output power to a certain power level, which in this example is an essential parameter because of local regulatory requirements. If the requested output power level is within the range allowed by the local regulatory requirements, the control entity authorizes the change and wireless communication subsystem modifies its output power level accordingly. If the requested output power level is outside the range allowed by the local regulatory requirements, the control entity may reject the requested change and the wireless communication subsystem is not instructed to modify its output power level or the control entity may set the power level to the nearest allowable output power level within the range allowed by the local regulatory requirements.

Figure 2:
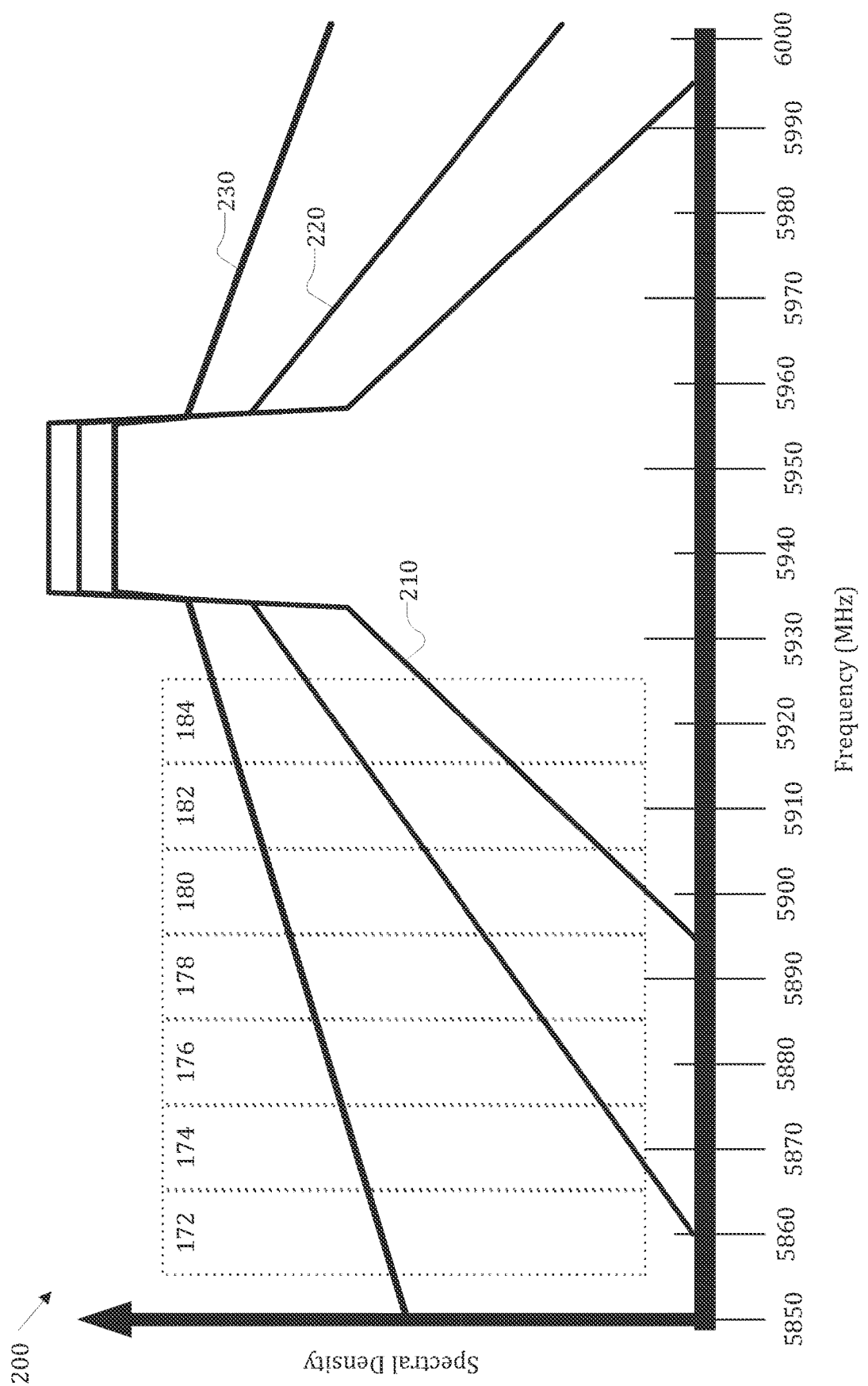
FIG. 2 shows exemplary spectral density masks for various wireless communication system channel bandwidths in approximately the 5.850 GHz to 5.935 GHz frequency range.

FIG. 2 shows exemplary allowable spectrum masks for various channel widths in various communication systems (e.g., in WiFi communication systems) that operate at or near the 5.9 GHz band. Graph 200 of FIG. 2 highlights the potential impact of such nearby wireless communications on ITS communications. Graph 200 plots frequency on the X axis (in MHz) and plots power spectral density (in dBm/MHz) on the Y axis. Also plotted on graph 200 are exemplary ITS communications channels (e.g., channels 172, 174, 176, 178, 180, 182, and 184) that have been plotted along the X axis to show where ITS communications may be taking place within this frequency range for this region. Turning to exemplary spectral mask 210, this depicts an allowable spectral mask of a WiFi communication channel with a 20 MHz bandwidth. This means that WiFi communications may emit wireless signals having an output power within (e.g., under) the plotted spectral mask 210. As can be seen in graph 200, the allowable output power from a WiFi communications channel with an allowable spectral mask 210 may emit wireless signals (e.g., spurious emissions) in the nearby ITS communications channels (e.g., exemplary channels 180, 182, and 184 of the exemplary ITS communications band shown in graph 200).

Turning to exemplary spectral mask 220 of FIG. 2, this depicts an allowable spectral mask of a WiFi communication channel with a 40 MHz bandwidth. As can be seen, the allowable output power from a WiFi communications channel with an allowable spectral mask 220 may emit wireless signals (e.g., spurious emissions) in the nearby ITS communications channels (e.g., exemplary channels 172, 174, 176, 178, 180, 182, and 184 of the exemplary ITS communications band shown in graph 200). As should be appreciated, the allowable power level of spectral mask 220 in the frequency range of nearby ITS communications channels may be higher than the allowable output power of spectral mask 210, and thus WiFi communications on this type of 40 MHz channel (corresponding to spectral mask 220) may result in a greater interference on ITS communications for these exemplary ITS communications channels than for the 20 MHz channel (corresponding to spectral mask 210).

Turning to exemplary spectral mask 230 of FIG. 2, this depicts an allowable spectral mask of a WiFi communication channel with a 80 MHz bandwidth. As can be seen, the allowable output power from a WiFi communications channel with an allowable spectral mask 230 may emit wireless signals (e.g., spurious emissions) in the nearby ITS communications channels (e.g., exemplary channels 172, 174, 176, 178, 180, 182, and 184 of the exemplary ITS communications band shown in graph 200). As should be appreciated, the allowable power level of spectral mask 230 in the frequency range of nearby ITS communications channels may be higher than the allowable output power of spectral masks 210 and 220, and thus WiFi communications on this type of 80 MHz channel (corresponding to spectral mask 230) may result in any even greater interference on ITS communications for these exemplary ITS communications channels as compared to the 20 MHz channel (corresponding to spectral mask 210) and to the 40 MHz channel (corresponding to spectral mask 220).

It should be appreciated that the above examples of spectral masks are exemplary and any type of allowable wireless communications operating nearby the ITS communications band may have some level of emissions in the ITS communications band, thereby potentially impacting the reliability of ITS communications. In particular, larger bandwidth modes have a wider spectral mask and may have a substantial affect on the performance of ITS systems operating in nearby frequency channels. In order to protect the performance of ITS systems, it is important to reduce or eliminate emissions in the ITS band (e.g., by selecting narrow-band channels, reducing output power, and/or selecting different channels that operate further away from the ITS communications band, etc.).

Figure 3:
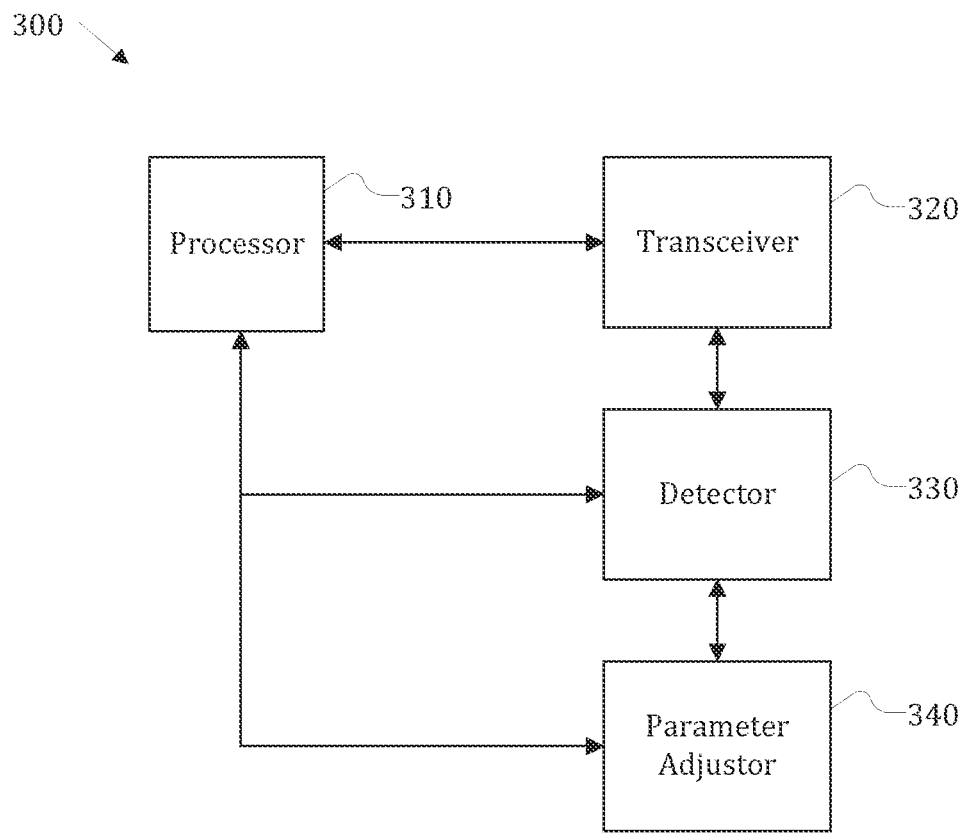
FIG. 3 depicts an exemplary system for configuring wireless communication parameters of a wireless communication device.

FIG. 3 shows an exemplary system 300 for a wireless device that improves protection of nearby ITS communications. The system 300 includes a processor 310, a transceiver 320, a detector 330, and a parameter adjustor 340 (e.g., a control entity). Processor 310 is configured to control and/or operate each of the transceiver 320, the detector 330, and the parameter adjustor 340, each of which may be a part of or a subsystem of the processor 330 and may communicate information with one another, either directly or indirectly through the processor 330. As noted earlier, it should be understood that any of the processors/subsystems described here may be realized as a single entity with equivalent functionality or the like, and conversely that any single processor/subsystem described here may be realized as two (or more) separate entities with equivalent functionality or the like.

Transceiver 320 of system 300 is configured to transmit and receive wireless signals in a first frequency band according transmission parameters that depend on a geographic location of the wireless device. For example, transceiver 320 may be a WiFi transceiver that is operating in a particular geographical location. Certain transmission parameters of the transceiver 320 may depend on the geographic location in which the transceiver 320 is operating. For example, the regulatory requirements for the geographic location may impose certain requirements on the transmission parameters of transceiver 320, including requirements that may impact ITS communications in a nearby ITS communications band. Examples of such requirements may include, for example, output power levels; frequency allocation (e.g., which frequency bands may be selected and which bandwidth is being used, each of which may impact ITS communications in nearby frequency bands); beamforming parameters (e.g., there may be limitations on the maximum equivalent isotropically radiated power (EIRP) and thus an implicit limit on the beam directivity at a given total output power level, which may be different depending on the region); etc.

Detector 330 of system 300 is configured to detect ITS radio signals that may be operating in a frequency band that is nearby (e.g., near-band or in an adjacent band, where wireless transmissions from transceiver 320 operating in a frequency band may interfere with the detected ITS communications operating in different frequency band). The detector 330 is configured to determine whether its wireless transmissions (and transmission parameters associated therewith) may cause interference with the detected ITS communications (e.g., an interference condition). The interference condition may be, for example, an interference level that may be caused by wireless transmissions from the transceiver 320 on the ITS radio signals.

If a potential interference condition is detected, parameter adjustor 340 may receive a request to adjust the transmission parameters for the transceiver 320. The new transmission parameters may be based on the detected interference condition. For example, the new transmission parameters may be configured to reduce the interference condition (e.g., reduce the impact of wireless communications of transceiver 320 on the detected ITS radio signals). In this sense, the new transmission parameters may be designed to configure the transceiver 320 to switch to a new channel that is further separated from the frequency at which the ITS radio signals were detected. The new transmission parameters may be designed to configure the transceiver 320 to exclude certain frequency band allocations (e.g., those that cause interference with the detected ITS radio signals) from its set of available frequencies to use for transmissions. The new transmission parameters may be designed to configure the transceiver 320 to reduce output power level or adapt its beamforming parameters to reduce the power level of the wireless transmissions from transceiver 320 in the frequency band of the detected ITS signals (e.g., reduce the power level so that the power level in the frequency band of the detected ITS signals is below a threshold power level). The new transmission parameters may be designed to configure the transceiver 320 to use a reduced bandwidth mode (e.g., switch from an 80 MHz bandwidth channel configuration that has higher out-of-band emissions in the frequency range of the ITS radio signals to a 40 MHz bandwidth channel configuration that has lower out-of-band emissions in the frequency range of the ITS radio signals). The new transmission parameters may be designed to configure the transceiver 320 to stop transmitting at certain times and/or for a certain time period(s) during which the ITS radio signals may also be transmitting. It should be appreciated that these examples of new transmission parameters are only exemplary, and different types of transmission parameters may be selected so as to reduce the interference caused by transceiver 320 on the detected ITS signals.

In addition, it should be appreciated that any number of new transmission parameters may be requested (individually or in any combination) that reduces the interference condition. For example, the requested new transmission parameters may depend on a severity of the interference condition, such that the new transmission parameters (individually or in any combination) may be selected to have a greater impact at remediating the interference condition. For example, if the detected ITS radio signals are relatively weak, occur at a frequency that is immediately adjacent to and at the same time as the wireless transmissions of the transceiver 320, and the wireless transmissions of the transceiver 320 are relatively high, the interference condition may be quite severe. As a result, the new transmission parameters may be more drastic in order to have a greater impact on protecting the ITS communications from the otherwise severe interference. For example, the new parameters may include stopping all communications by the transceiver 320 on channels that use frequencies in the 5 GHz frequency band, switching the timing of all communications by the transceiver 320 to a time period that is not used by the detected ITS communications, and/or use beam forming for the communications by the transceiver 320 to radiate its wireless communications signals away from the location of the detected ITS signals.

In addition, the request to adjust the transmission parameters for the transceiver may be based on a trigger. For example, the trigger may be the point at which the detector 330 detects the interference condition (e.g., detects that nearby ITS communications are occurring in a near-band or a frequency band adjacent to the frequency band for the transceiver 320), the point at which the parameter adjustor receives the request to adjust the transmission parameters to new parameters, and/or the point at which the parameter adjustor verifies and implements the new transmission parameters. The trigger may be time-based (e.g., the nearby ITS communications channels are scanned for ITS signals at an interval (e.g., every microsecond, every second, every hour) and/or condition based (e.g., when the transceiver 320 moves to a new location, when a threshold power level is detected in the ITS communication band, and/or when a request is received from an external system (e.g., an ITS device in close proximity to the transceiver 320). As an example, the ITS device may inform transceiver 320 that it intends to transmit at a particular time period, in a particular frequency range, and/or at a certain power level. In response, new parameters may be requested to reduce or avoid interference from the transceiver 320 on the communications of the ITS device. As another example, the ITS device may itself request for the transceiver 320 to use certain transmission parameters designed to reduce interference of wireless transmissions of the transceiver 320 with the ITS communications of the ITS device.

The parameter adjustor 340 is also configured to verify that the requested new transmission parameters comply with the regulatory requirements for the geographic location in which transceiver 320 is operating. As noted earlier, the frequency range for ITS communications may be different depending on the regulatory region associated with the particular geographic location, so the parameter adjustor 340 may use the geographic location in which the transceiver 320 is operating in order to determine how, if at all, its wireless communications may impact nearby ITS equipment authorized for use in the region. If the new transmission parameters comply with the regulatory requirements for the geographic location (and, by extension, the out-of-band interference requirements that may impact ITS communications in a nearby ITS frequency band), the parameter adjustor 340 implements the new transmission parameters by reconfiguring the transceiver 320 to have the new transmission parameters. As a result, the wireless transceiver 320 will be configured in such a manner that complies with regulatory requirements of the region and reduces the interference condition on ITS communications in the region, thereby providing improved protection to the detected ITS communication devices nearby.

In addition, the parameter adjustor 340 may differentiate between those wireless transmission parameters that may impact nearby ITS communications (e.g., parameters that have a significant impact on out-of-band emission levels within the ITS communication band (e.g., essential parameters), such as output power level, channel (e.g., frequency) selection, activation/deactivation of dynamic frequency selection, provisioning of software components which affect lower communications layers (typically layers 1, 2, and/or 3 in the open systems interconnect (OSI) model), beamforming parameters, channel access parameters, etc. and those wireless transmission parameters that do not have a significant impact on out-of-band emission levels within the ITS communications band (e.g., non-essential parameters). As noted earlier, the list of exemplary essential parameters are not restricted to the examples provided, and the categorization of a given parameter as an essential or non-essential parameter may depend on regional regulatory requirements. In addition, the parameter adjustor 340 may categorize wireless transmission parameters as essential if they may impact regional requirements (e.g., essential parameters may also be based on regional requirements).

The parameter adjustor 340 may limit/allow access to change the wireless transmission parameters of the transceiver 320, depending on whether the transmission parameter may be an essential parameter (e.g., those impacting regulatory requirements and/or ITS communications) or a non-essential parameter (e.g., those not impacting regulatory requirements and/or ITS communications). If the transmission parameter is an essential parameter, parameter adjustor 340 may prevent changes to the transmission parameter and/or parameter adjustor 340 may limit selection of values for the essential parameters to pre-determined values or pre-determined ranges that are proscribed by the regional regulatory requirements or that are designed to protect ITS devices from interference. In addition, parameter adjustor 340 may limit/allow access depending on which user or entity is making the request. If an authorized user or device (e.g., an expert user) requests a particular change that would otherwise violate the regional regulatory requirements for the region or would otherwise have an adverse impact on ITS communications in the ITS band, the parameter adjustor 340 may allow the change (e.g., via an expert mode) to the essential parameter. In addition, if the requested change is to a non-essential transmission parameter, the parameter adjustor 340 may allow the change without verifying whether the value for transmission parameter complies with regulatory requirements for the region and/or without verifying whether the value for the transmission parameter may adversely impact ITS communications.

Figure 4:
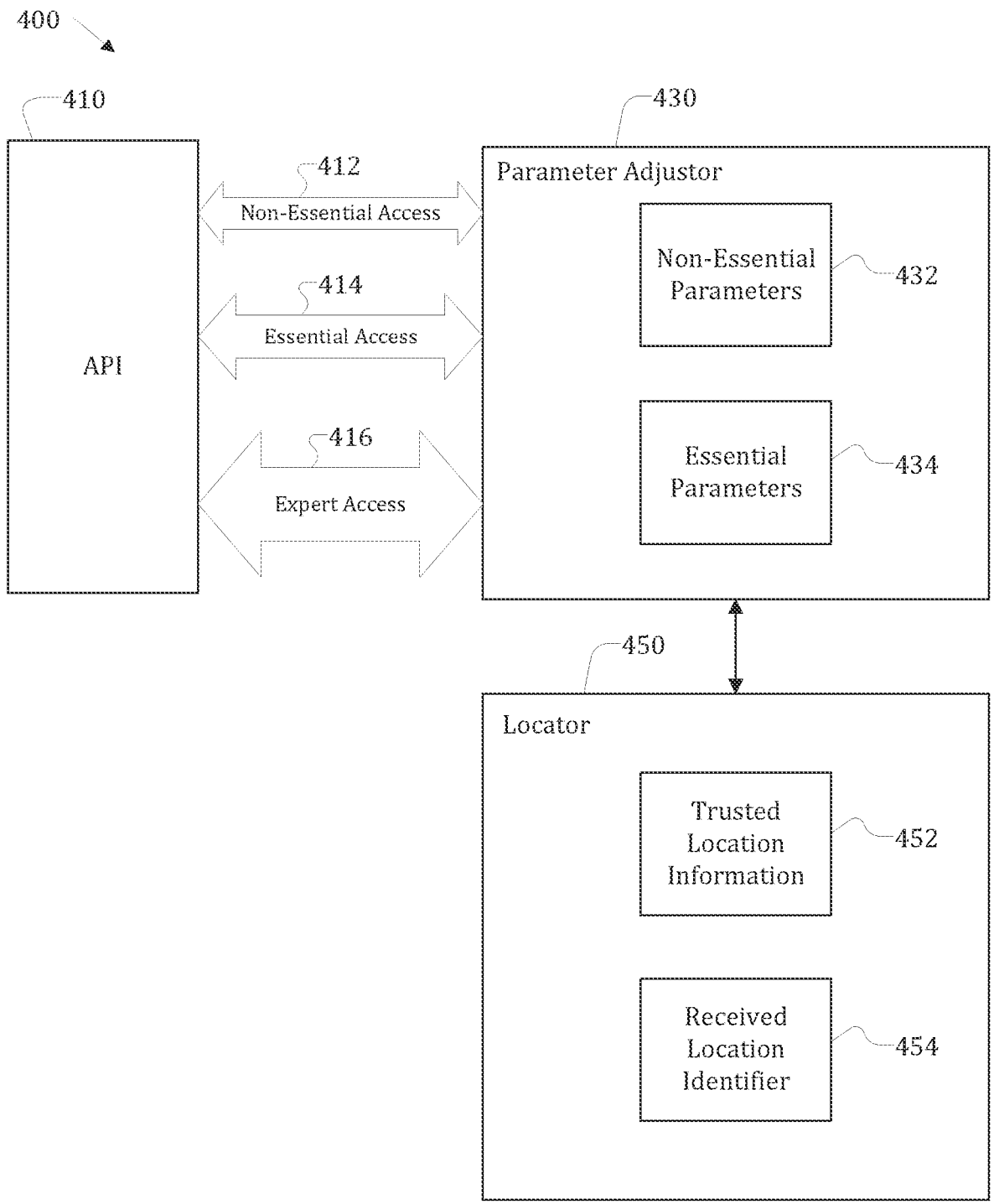
FIG. 4 depicts an exemplary system for configuring wireless communication parameters of a wireless communication device.

FIG. 4 depicts an exemplary system 400 for a wireless device that improves protection of nearby ITS communications. The system 400 may include and operate according to any of the hardware and features described above with respect to system 300. For example, system 400 may include a parameter adjustor 430 (e.g., a control entity) that may operate according to the features described above with respect to the parameter adjustor 330 of FIG. 3, include the organization of the wireless transmission parameters into essential parameters and non-essential parameters. As shown in FIG. 4, the parameter adjustor 430 has organized its wireless transmission parameters into essential parameters 434 and non-essential parameters 432. These parameters may be organized as described above with respect to parameter adjustor 320 of FIG. 3.

Access to make changes to essential parameters 434 and non-essential parameters 432 may be made through an application programming interface API (e.g., API 410). In this regard, parameter adjustor 430 may allow different types of access through API 410, including non-essential access 412, essential access 414, and/or expert access 416. Non-essential access 412 may provide full access to modify non-essential parameters 432. As non-essential parameters 432 are typically those parameters that have been determined to not impact regulatory requirements and/or nearby ITS communications, these parameters may be changed by any type of user/entity using non-essential access 412.

Essential access 414 may provide limited access to modify essential parameters 434. As essential parameters 434 are typically those parameters that have been determined may impact regulatory requirements and/or nearby ITS communications, the adjustment of the these parameters may limited. For example, only certain users/entities may use essential access 414. Additionally or alternatively, the values that may be selected for the essential parameters 434 using essential access 414 may be limited to a fixed set of values or a range of values that are designed to comply with regulatory requirements and/or protect nearby ITS communications. This ensures that the wireless communications operate with parameters that comply with regulatory requirements of the region and respect interference requirements that may protect ITS communications.

Expert access 416 may provide unlimited access to modify essential parameters 434. For example, certain users/entities may require access (e.g., for testing purposes or for emergency situations) to adjust the values of the essential parameters to values that may not comply with regulatory requirements and/or may not protect nearby ITS communications. These users/entities may be required to provide an authorization code to use the expert access 416, and the extent of the adjustment of essential parameters 434 allowed by expert access 416 may depend on the authorization code and/or the identity of the user/entity.

In addition, system 400 may include a locator 450 for determining and/or verifying the location of the wireless device of system 400. As explained above, the allowed transmission parameters for the wireless device may depend on the regulatory region in which the wireless device is operating. As such, it may be important for the system 400 to verify and/or determine the region (e.g., the geographical location) in which the wireless device is operating. The locator 450 may determine the location using trusted location information 425. Trusted location information may be information that allows the locator 450 to make a reliable and verified determination of the geographic location of the wireless device (e.g., a location determination that minimizes the risk of receiving false, incorrect, and/or altered location information). Trusted location information may be based on any number of sensors or other devices that provide trusted region-relevant information that may assist the locator 450 in determining a verified location (e.g., a received location identifier 454 from a trusted source may be trusted location information 452).

For example, a Global Positioning System (GPS) receiver may obtain a received location identifier 454 in the form of a the current GPS position of the wireless device, and using the information, determine a trusted location. In turn, the system 400 may select the corresponding regulatory parameters for the region associated with the trusted location and/or may select the operating parameters based on the precise location to minimize potential impacts on nearby ITS communication systems. For example, if the locator 450 determines that the wireless device is operating near a busy road, the system 400 may select the transmission parameters that minimize impact of ITS communications that are likely to occur on the nearby road. As should be appreciated, other types of location-based receivers may be used instead of or in addition to a GPS receiver.

For example, an LTE device or a WiFi device may be used that is configured to detect nearby base stations/access points. Based on the location and/or configuration parameters (e.g., a received location identifier 454) of the detected nearby base stations/access points, the locator 450 may determine/verify a trusted location of the wireless device. For example, a Base Station Identification (BSID) may be a received location identifier 454 that provides information about the region in which it is operating. As another example, given that LTE/WiFi configuration parameters may be specific to a particular region (e.g., a different configuration parameter is used in Europe as compared to the United States or China), the LTE/WiFi configuration parameters of nearby base stations may be used to determine/verify the region of wireless device. Even though the LTE configuration parameters may not provide as precise of a geographic location as, for example, a GPS receiver, the information may still may be sufficient to determine the regulatory requirements of the region. For example, if an particular LTE configuration parameter is used only in China, then this LTE parameter may be sufficient for identifying China as the geographic location, and correspondingly, the associated regulatory requirements with the region.

If the locator 450 is unable to obtain a received location identifier 454 and/or unable to determine a trusted location from trusted location information 452, the system 400 may select values for transmission parameters that comply with the regulatory requirements for all regions. For example, assume that the maximum output power level at a specific frequency $f_0$ is regulated in the Americas, Europe, China, and Japan at different levels. Thus, $Pmax(f_{0, America})$ for the Americas, $Pmax(f_{0, Europe})$ for Europe, $Pmax(f_{0, China})$ for China, and $Pmax(f_{0, Japan})$ for Japan. If locator 450 is unable to determine/verify whether the wireless device is operating in the Americas, Europe, China, or Japan, system 400 may use an applied power level value that does not exceed the lowest of the maximum output powers allowed for all of the regions. Hence, $Pmax\_applied = min\{Pmax(f_{0, America}), Pmax(f_{0, Europe}), Pmax(f_{0, China}), Pmax(f_{0, Japan})\}$. Selecting the minimum of the maximum output power allowed for all regions ensures compliance in any region in which the wireless device may be located. It should be appreciated that maximum output power is merely an example of one transmission that may be an essential parameter in multiple regions, and this same method may be used for any essential parameter.

Figure 5:
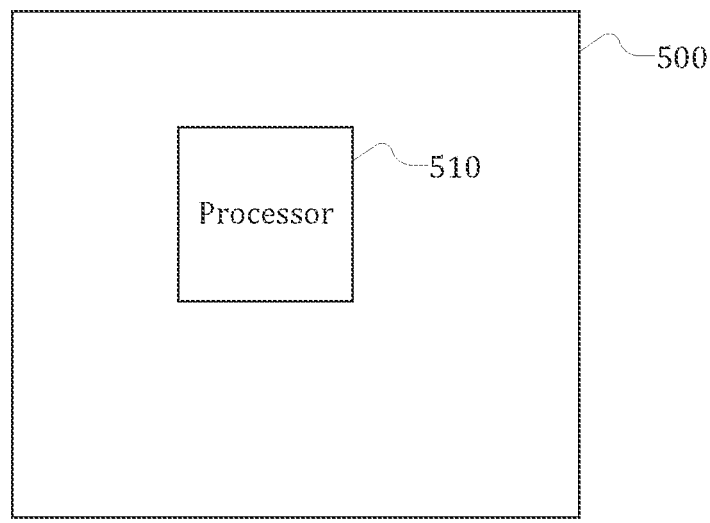
FIG. 5 shows an exemplary system for configuring wireless communication parameters of a wireless communication device.

FIG. 5 is a schematic drawing illustrating an device 500 for protecting nearby ITS communications. The device 500 may include any of the features described above with respect to systems 300 and/or 400. Device 500 of FIG. 4 may be implemented as an apparatus, a method, and/or a computer readable medium that, when executed, performs the features described with respect to systems 300 and/or 400. It should be understood that device 500 is only an example, and other configurations may be possible that include, for example, different components or additional components, that implement the features described above with respect to systems 300 and/or 400.

Device 500 includes a processor 510. The processor 510 of device 500 is configured to detect radio signals of an intelligent transport system (ITS) communication device in an environment of the device, wherein the radio signals are detected in a first frequency band. The processor 510 is also configured to determine radio communication parameters of the detected radio signals. The processor 510 is also configured to determine an interference condition based on whether radio subsystem communication parameters of a radio communication subsystem of the device may interfere with the determined radio communication parameters, wherein the radio communication subsystem is configured to operate in a second frequency band that is different from the first frequency band. The processor 510 is also configured to request a change of the radio subsystem communication parameters, wherein the requested change is based on the interference condition. The processor 510 is also configured to determine a geographic location of the device. The processor 510 is also configured to implement the requested change based on whether the requested change complies with a regulatory requirement of the determined geographic location.

Furthermore, in addition to or in combination with any one of the features of this and/or the preceding paragraph, the interference condition may include an interference level of the radio communication subsystem on the radio signals of the ITS communication device. Furthermore, in addition to or in combination with any one of the features of this and/or the preceding paragraph, the radio subsystem communication parameters may include essential parameters and non-essential parameters, wherein the essential parameters depend on the determined geographic location of the device. Furthermore, in addition to or in combination with any one of the features of this and/or the preceding paragraph, the requested change may depend on a severity of the interference condition. Furthermore, in addition to or in combination with any one of the features of this and/or the preceding paragraph, the requested change may be configured to reduce the interference condition. Furthermore, in addition to or in combination with any one of the features of this and/or the preceding paragraph, the requested change may include at least one of an output power level, a beamforming parameter, a frequency channel, a transmission period, and/or a signal bandwidth. Furthermore, in addition to or in combination with any one of the features of this and/or the preceding paragraph, the radio subsystem communication parameters may include radio frequency (RF) channels within the second frequency band that are available for use by the device, wherein the RF channels exclude RF channels that would cause a threshold level of interference in the first frequency band.

Furthermore, in addition to or in combination with any one of the features of this and/or the preceding two paragraphs, the processor may be further configured to measure over the first frequency band a power level of the detected radio signals, wherein the interference condition is based on the measured power level. Furthermore, in addition to or in combination with any one of the features of this and/or the preceding two paragraphs, the processor may be configured to determine the geographic location of the device based on a received signal identifier received at the device, wherein the received signal identifier may include at least one of a base station identification signal, a global positioning system signal, and/or an LTE signal. Furthermore, in addition to or in combination with any one of the features of this and/or the preceding two paragraphs, the radio subsystem communication parameters may include sets of predefined transmission parameters that comply with the regulatory requirement for a geographic region, wherein the processor is configured to implement the requested change by selecting from among the sets of predefined operating values the set that corresponds to the geographic location of the device.

Figure 6:
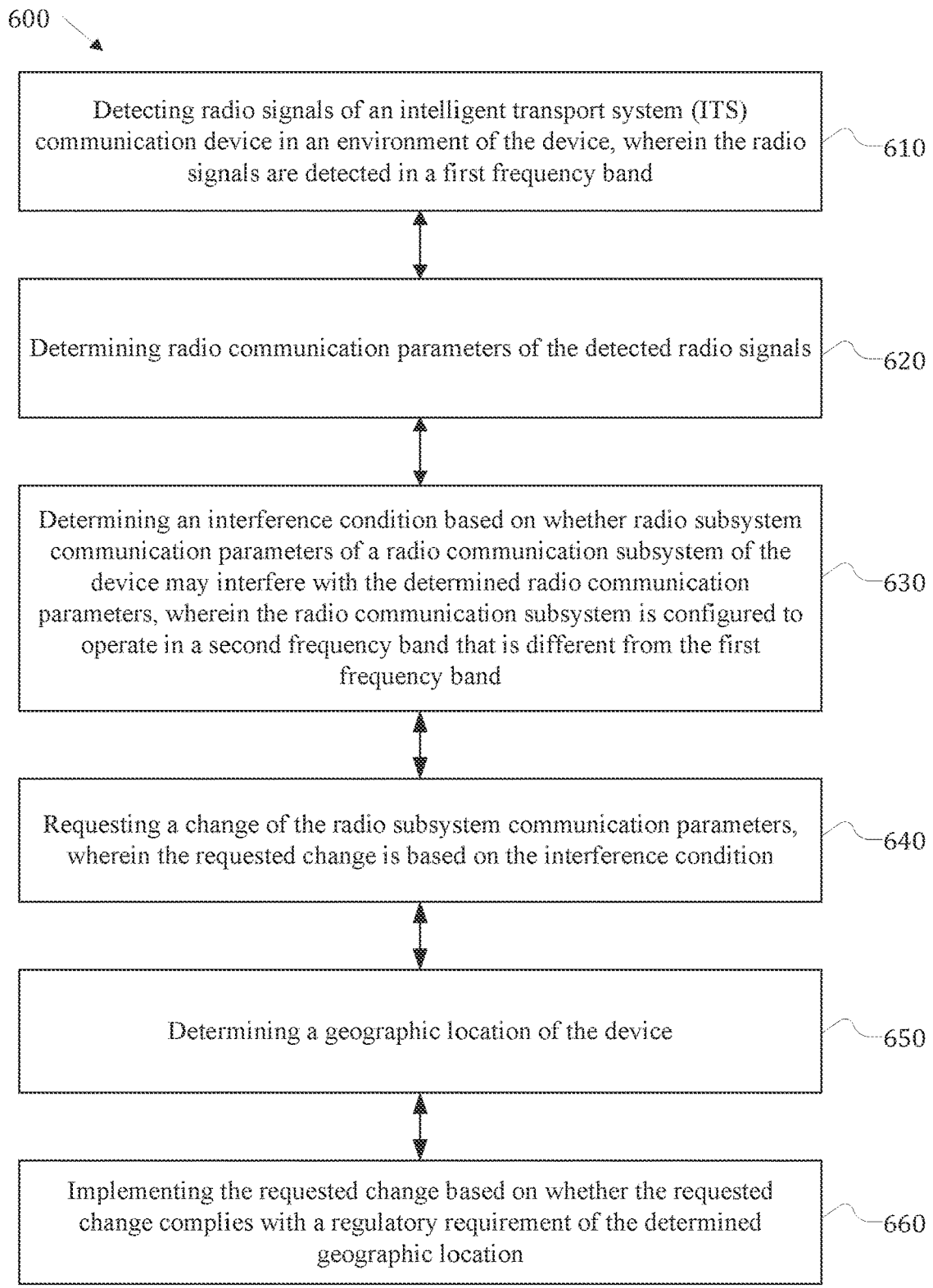
FIG. 6 shows a schematic flow diagram for configuring wireless communication parameters.

FIG. 6 depicts a schematic flow diagram of a method 600 for configuring wireless communication parameters of a wireless device. Method 600 may implement any of the features described above with respect to systems 300 and/or 400.

Method 600 for configuring wireless communication parameters of a wireless device includes, in 610, detecting radio signals of an intelligent transport system (ITS) communication device in an environment of the device, wherein the radio signals are detected in a first frequency band. Method 600 includes, in 620, determining radio communication parameters of the detected radio signals. Method 600 includes, in 630, determining an interference condition based on whether radio subsystem communication parameters of a radio communication subsystem of the device may interfere with the determined radio communication parameters, wherein the radio communication subsystem is configured to operate in a second frequency band that is different from the first frequency band.

Method 600 includes, in 640, requesting a change of the radio subsystem communication parameters, wherein the requested change is based on the interference condition. Method 600 includes, in 650, determining a geographic location of the device. Method 600 includes, in 660, implementing the requested change based on whether the requested change complies with a regulatory requirement of the determined geographic location.

Example 1 is a device including a processor. The processor is configured to detect radio signals of an intelligent transport system (ITS) communication device in an environment of the device, wherein the radio signals are detected in a first frequency band. The processor is also configured to determine radio communication parameters of the detected radio signals. The processor is also configured to determine an interference condition based on whether radio subsystem communication parameters of a radio communication subsystem of the device may interfere with the determined radio communication parameters, wherein the radio communication subsystem is configured to operate in a second frequency band that is different from the first frequency band. The processor is also configured to request a change of the radio subsystem communication parameters, wherein the requested change is based on the interference condition. The processor is also configured to determine a geographic location of the device. The processor is also configured to implement the requested change based on whether the requested change complies with a regulatory requirement of the determined geographic location.

Example 2 is a the device of Example 1, wherein the interference condition includes an interference level of the radio communication subsystem on the radio signals of the ITS communication device.

Example 3 is the device of either Examples 1 or 2, wherein the radio subsystem communication parameters include essential parameters and non-essential parameters, wherein the essential parameters depend on the determined geographic location of the device.

Example 4 is the device of any one of Examples 1 to 3, wherein the requested change depends on a severity of the interference condition.

Example 5 is the device of any one of Examples 1 to 4, wherein the requested change is configured to reduce the interference condition.

Example 6 is the device of any one of Examples 1 to 5, wherein the ITS communication device includes at least one of a cellular vehicle-to-everything (C-V2X) device, a 5 GHz intelligent transport systems (ITS-G5) device, and/or a dedicated short-range communications (DSRC) device.

Example 7 is the device of any one of Examples 1 to 6, wherein the requesting the change of the radio subsystem communication parameters includes a determination by the device to request the change and/or receiving an indication from the ITS communication device requesting the change.

Example 8 is the device of any one of Examples 1 to 7, wherein the requested change includes at least one of an output power level, a beamforming parameter, a frequency channel, a transmission period, and/or a signal bandwidth.

Example 9 is the device of any one of Examples 1 to 8, wherein the radio subsystem communication parameters include radio frequency (RF) channels within the second frequency band that are available for use by the device, wherein the RF channels exclude RF channels that would cause a threshold level of interference in the first frequency band.

Example 10 is the device of any one of Examples 1 to 9, wherein the processor is further configured to measure over the first frequency band a power level of the detected radio signals, wherein the interference condition is based on the measured power level.

Example 11 is the device of any one of Examples 1 to 10, wherein the processor is configured to determine the geographic location of the device based on a received signal identifier received at the device, wherein the received signal identifier includes at least one of a base station identification signal, a global positioning system signal, and/or an LTE signal.

Example 12 is the device of any one of Examples 1 to 11, wherein the radio subsystem communication parameters include sets of predefined transmission parameters that comply with the regulatory requirement for a geographic region, wherein the processor is configured to implement the requested change by selecting from among the sets of predefined operating values the set that corresponds to the geographic location of the device.

Example 13 is the device of any one of Examples 1 to 12, wherein the first frequency band is nearby the second frequency band.

Example 14 is the device of any one of Examples 1 to 13, wherein the first frequency band is adjacent to the second frequency band.

Example 15 is the device of any one of Examples 1 to 14, wherein the requested change is based on a trigger.

Example 16 is the device of Example 15, wherein the trigger includes a determination that the interference condition exceeds a threshold interference level in the first frequency band.

Example 17 is the device of either one of Example 15 or 16, wherein the trigger includes receiving a request from the ITS communication device to change the radio subsystem communication parameters.

Example 18 is the device of any one of Examples 15 to 17, wherein the trigger is based on an a time period, where the time period is preferably every microsecond.

Example 19 is the device of any one of Examples 15 to 18, wherein the trigger is based on a change in the geographic location of the device.

Example 20 is a wireless device that includes a transceiver configured to transmit and receive wireless signals according transmission parameters that depend on a geographic location of the wireless device, wherein the radio signals are detected in a first frequency band. The wireless device further includes a detector configured to detect intelligent transport system (ITS) radio signals at the wireless device, wherein the detector is further configured to determine an interference condition based on the detected ITS radio signals, and wherein the radio communication subsystem is configured to operate in a second frequency band that is different from the first frequency band. The wireless device further includes a parameter adjustor configured to receive a request based on the interference condition to adjust the transmission parameters to new transmission parameters. The parameter adjustor of the wireless device is further configured to implement the new transmission parameters in the transceiver based on whether the new transmission parameters comply with a regulatory requirement of the geographic location.

Example 21 is the wireless device of Example 20, wherein the interference condition includes an interference level of the wireless signals on the ITS radio signals.

Example 22 is the wireless device of either one of Example 20 or 21, wherein the transceiver is further configured to transmit and receive the wireless signals according to general transmission parameters that are independent of the geographic location, wherein the parameter adjuster is configured to adjust the general transmission parameters without verifying the general transmission parameters comply with the regulatory requirement.

Example 23 is the wireless device of any one of Examples 20 to 22, wherein the new transmission parameters depends on a severity of the interference condition.

Example 24 is the wireless device of any one of Examples 20 to 23, wherein the new transmission parameters are configured to reduce the interference condition.

Example 25 is the wireless device of any one of Examples 20 to 24, wherein the ITS radio signals include at least one of a cellular vehicle-to-everything (C-V2X) signal, a 5 GHz intelligent transport systems (ITS-G5) signal, and/or a dedicated short-range communications (DSRC) signal.

Example 26 is the wireless device of any one of Examples 20 to 25, wherein the requested change is received from the wireless device and/or is received from an ITS communication device associated with the ITS radio signals.

Example 27 is the wireless device of any one of Examples 20 to 26, wherein the new transmission parameters include at least one of an output power level, a beamforming parameter, a frequency channel, a transmission period, and/or a signal bandwidth.

Example 28 is the wireless device of any one of Examples 20 to 27, wherein the transmission parameters include radio frequency (RF) channels that are available for the transceiver to transmit the wireless signals within the first frequency band, wherein the RF channels exclude frequencies that would cause a threshold level of interference in the second frequency band.

Example 29 is the wireless device of any one of Examples 20 to 28, wherein the detector is configured to detect ITS radio signals by measuring at an interval a power level of the detected ITS radio signals, and wherein the parameter adjustor is configured to receive the request at the interval.

Example 30 is the wireless device of any one of Examples 20 to 29, wherein the detector is configured to determine, based on a received signal identifier received at the wireless device, whether the geographic location corresponds to one of a plurality of regulatory regions, each regulatory region having a corresponding regulatory requirement, wherein the received signal identifier includes at least one of a base station identification signal, a global positioning system signal, and/or an LTE signal.

Example 31 is the wireless device of Example 30, wherein if the detector determines that the geographic location does not correspond to one of the plurality of regulatory regions, the parameter adjustor is configured to implement the new transmission parameters in the transceiver based on whether the new transmission parameters comply with regulatory requirements for each of the plurality of regulatory regions.

Example 32 is the wireless device of any one of Examples 20 to 31, wherein the first frequency band is nearby the second frequency band.

Example 33 is the wireless device of any one of Examples 20 to 32, wherein the first frequency band is adjacent to the second frequency band.

Example 34 is the wireless device of any one of Examples 20 to 33, wherein the request is based on a trigger.

Example 35 is the wireless device of Example 34, wherein the trigger includes a determination that the interference condition exceeds a threshold interference level in the first frequency band.

Example 36 is the wireless device of either one of Example 34 or 35, wherein the trigger includes receiving a request from an ITS communication device associated with the ITS radio signals to change the radio subsystem communication parameters.

Example 37 is the wireless device of any one of Examples 34 to 36, wherein the trigger is based on an a time period, where the time period is preferably every microsecond.

Example 38 is the wireless device of any one of Examples 34 to 37, wherein the trigger is based on a change in the geographic location of the device.

Example 39 is a method for configuring wireless parameters of a wireless device. The method includes detecting radio signals of an intelligent transport system (ITS) communication device in an environment of the wireless device, wherein the radio signals are detected in a first frequency band. The method also includes determining radio communication parameters of the detected radio signals. The method also includes determining an interference condition based on whether radio subsystem communication parameters of a radio communication subsystem of the wireless device may interfere with the determined radio communication parameters, wherein the radio communication subsystem is configured to operate in a second frequency band that is different from the first frequency band. The method also includes requesting a change of the radio subsystem communication parameters, wherein the requested change is based on the interference condition. The method also includes determining a geographic location of the wireless device. The method also includes implementing the requested change based on whether the requested change complies with a regulatory requirement of the determined geographic location.

Example 40 is a the method of Example 39, wherein the interference condition includes an interference level of the radio communication subsystem on the radio signals of the ITS communication device.

Example 41 is the method of either Examples 39 or 40, wherein the radio subsystem communication parameters include essential parameters and non-essential parameters, wherein the essential parameters depend on the determined geographic location of the wireless device.

Example 42 is the method of any one of Examples 39 to 41, wherein requesting the change depends on a severity of the interference condition.

Example 43 is the method of any one of Examples 39 to 42, wherein requesting the change is configured to reduce the interference condition.

Example 44 is the method of any one of Examples 39 to 43, wherein the ITS communication device includes at least one of a cellular vehicle-to-everything (C-V2X) device, a 5

GHz intelligent transport systems (ITS-G5) device, and/or a dedicated short-range communications (DSRC) device.

Example 45 is the method of any one of Examples 39 to 44, wherein the requesting the change of the radio subsystem communication parameters includes a determination by the wireless device to request the change and/or receiving an indication from the ITS communication device requesting the change.

Example 46 is the method of any one of Examples 39 to 45, wherein requesting the change includes at least one of an output power level, a beamforming parameter, a frequency channel, a transmission period, and/or a signal bandwidth.

Example 47 is the method of any one of Examples 39 to 46, wherein the radio subsystem communication parameters include radio frequency (RF) channels within the second frequency band that are available for use by the wireless device, wherein the RF channels exclude RF channels that would cause a threshold level of interference in the first frequency band.

Example 48 is the method of any one of Examples 39 to 47, further including measuring over the first frequency band a power level of the detected radio signals, wherein the interference condition is based on the measured power level.

Example 49 is the method of any one of Examples 39 to 48, further including determining the geographic location of the wireless device based on a received signal identifier received at the wireless device, wherein the received signal identifier includes at least one of a base station identification signal, a global positioning system signal, and/or an LTE signal.

Example 50 is the method of any one of Examples 39 to 49, wherein the radio subsystem communication parameters include sets of predefined transmission parameters that comply with the regulatory requirement for a geographic region, wherein method further includes implementing the requested change by selecting from among the sets of predefined operating values the set that corresponds to the geographic location of the wireless device.

Example 51 is the method of any one of Examples 39 to 50, wherein the first frequency band is nearby the second frequency band.

Example 52 is the method of any one of Examples 39 to 51, wherein the first frequency band is adjacent to the second frequency band.

Example 53 is the method of any one of Examples 39 to 52, wherein requesting the change is based on a trigger.

Example 54 is the method of Example 53, wherein the trigger includes a determination that the interference condition exceeds a threshold interference level in the first frequency band.

Example 55 is the method of either one of Example 53 or 54, wherein the trigger includes receiving a request from the ITS communication device to change the radio subsystem communication parameters.

Example 56 is the method of any one of Examples 53 to 55, wherein the trigger is based on an a time period, where the time period is preferably every microsecond.

Example 57 is the method of any one of Examples 53 to 56, wherein the trigger is based on a change in the geographic location of the wireless device.

Example 58 is one or more non-transient computer readable media, configured to cause one or more processors, when executed, to perform a method for configuring wireless parameters of a wireless device. The method stored in the non-transient computer readable media includes detecting radio signals of an intelligent transport system (ITS) communication device in an environment of the device, wherein the radio signals are detected in a first frequency band. The method also includes determining radio communication parameters of the detected radio signals. The method also includes determining an interference condition based on whether radio subsystem communication parameters of a radio communication subsystem of the device may interfere with the determined radio communication parameters, wherein the radio communication subsystem is configured to operate in a second frequency band that is different from the first frequency band. The method also includes requesting a change of the radio subsystem communication parameters, wherein the requested change is based on the interference condition. The method also includes determining a geographic location of the device. The method also includes implementing the requested change based on whether the requested change complies with a regulatory requirement of the determined geographic location.

Example 59 is the non-transient computer readable media of Example 58, wherein the interference condition includes an interference level of the radio communication subsystem on the radio signals of the ITS communication device.

Example 60 is the non-transient computer readable media of either Examples 58 or 59, wherein the radio subsystem communication parameters include essential parameters and non-essential parameters, wherein the essential parameters depend on the determined geographic location of the device.

Example 61 is the non-transient computer readable media of any one of Examples 58 to 60, wherein requesting the change depends on a severity of the interference condition.

Example 62 is the non-transient computer readable media of any one of Examples 58 to 61, wherein requesting the change is configured to reduce the interference condition.

Example 63 is the non-transient computer readable media of any one of Examples 58 to 62, wherein the ITS communication device includes at least one of a cellular vehicle-to-everything (C-V2X) device, a 5 GHz intelligent transport systems (ITS-G5) device, and/or a dedicated short-range communications (DSRC) device.

Example 64 is the non-transient computer readable media of any one of Examples 58 to 63, wherein the requesting the change of the radio subsystem communication parameters includes a determination by the device to request the change and/or receiving an indication from the ITS communication device requesting the change.

Example 65 is the non-transient computer readable media of any one of Examples 58 to 64, wherein requesting the change includes at least one of an output power level, a beamforming parameter, a frequency channel, a transmission period, and/or a signal bandwidth.

Example 66 is the non-transient computer readable media of any one of Examples 58 to 65, wherein the radio subsystem communication parameters include radio frequency (RF) channels within the second frequency band that are available for use by the device, wherein the RF channels exclude RF channels that would cause a threshold level of interference in the first frequency band.

Example 67 is the non-transient computer readable media of any one of Examples 58 to 66, further including measuring over the first frequency band a power level of the detected radio signals, wherein the interference condition is based on the measured power level.

Example 68 is the non-transient computer readable media of any one of Examples 58 to 67, further including determining the geographic location of the device based on a received signal identifier received at the device, wherein the received signal identifier includes at least one of a base station identification signal, a global positioning system signal, and/or an LTE signal.

Example 69 is the non-transient computer readable media of any one of Examples 58 to 68, wherein the radio subsystem communication parameters include sets of predefined transmission parameters that comply with the regulatory requirement for a geographic region, wherein method further includes implementing the requested change by selecting from among the sets of predefined operating values the set that corresponds to the geographic location of the device.

Example 70 is the non-transient computer readable media of any one of Examples 58 to 69, wherein the first frequency band is nearby the second frequency band.

Example 71 is the non-transient computer readable media of any one of Examples 58 to 70, wherein the first frequency band is adjacent to the second frequency band.

Example 72 is the non-transient computer readable media of any one of Examples 58 to 71, wherein requesting the change is based on a trigger.

Example 73 is the non-transient computer readable media of Example 72, wherein the trigger includes a determination that the interference condition exceeds a threshold interference level in the first frequency band.

Example 74 is the non-transient computer readable media of either one of Example 72 or 73, wherein the trigger includes receiving a request from the ITS communication device to change the radio subsystem communication parameters.

Example 75 is the non-transient computer readable media of any one of Examples 72 to 74, wherein the trigger is based on an a time period, where the time period is preferably every microsecond.

Example 76 is the non-transient computer readable media of any one of Examples 72 to 75, wherein the trigger is based on a change in the geographic location of the wireless device.

Example 77 is a wireless device that includes a means for transmitting and receiving wireless signals according transmission parameters that depend on a geographic location of the wireless device, wherein the radio signals are detected in a first frequency band. The wireless device further includes a means for detecting intelligent transport system (ITS) radio signals at the wireless device, wherein the means for detecting is further configured to determine an interference condition based on the ITS radio signals, and wherein the radio communication subsystem is configured to operate in a second frequency band that is different from the first frequency band. The wireless device further includes means for receiving a request based on the interference condition and a means for adjusting the transmission parameters to new transmission parameters. The means for adjusting parameters of the wireless device is further configured to implement the new transmission parameters in the means for sending and receiving wireless signals based on whether the new transmission parameters comply with a regulatory requirement of the geographic location.

Example 78 is the wireless device of Example 77, wherein the interference condition includes an interference level of the wireless signals on the ITS radio signals.

Example 79 is the wireless device of either one of Example 77 or 78, wherein the means for sending and receiving wireless signals is further configured to transmit and receive the wireless signals according to general transmission parameters that are independent of the geographic location, wherein the means for adjusting parameters is configured to adjust the general transmission parameters without verifying the general transmission parameters comply with the regulatory requirement.

Example 80 is the wireless device of any one of Examples 77 to 79, wherein the new transmission parameters depends on a severity of the interference condition.

Example 81 is the wireless device of any one of Examples 77 to 80, wherein the new transmission parameters are configured to reduce the interference condition.

Example 82 is the wireless device of any one of Examples 77 to 81, wherein the ITS radio signals include at least one of a cellular vehicle-to-everything (C-V2X) signal, a 5 GHz intelligent transport systems (ITS-G5) signal, and/or a dedicated short-range communications (DSRC) signal.

Example 83 is the wireless device of any one of Examples 77 to 82, wherein the means for receiving the request includes a means for receiving a the request from the device and/or a means for receiving the request from an ITS communication associated with the ITS radio signals.

Example 84 is the wireless device of any one of Examples 77 to 83, wherein the new transmission parameters include at least one of an output power level, a beamforming parameter, a frequency channel, a transmission period, and/or a signal bandwidth.

Example 85 is the wireless device of any one of Examples 77 to 84, wherein the transmission parameters include radio frequency (RF) channels that are available for the means for sending and receiving wireless signals to transmit the wireless signals within the first frequency band, wherein the RF channels exclude frequencies that would cause a threshold level of interference in the second frequency band.

Example 86 is the wireless device of any one of Examples 77 to 85, wherein the means for detecting is configured to detect ITS radio signals by measuring at an interval a power level of the ITS radio signals, and wherein the means for adjusting parameters is configured to receive the request at the interval.

Example 87 is the wireless device of any one of Examples 77 to 86, wherein the means for detecting is configured to determine, based on a received signal identifier received at the wireless device, whether the geographic location corresponds to one of a plurality of regulatory regions, each regulatory region having a corresponding regulatory requirement, wherein the received signal identifier includes at least one of a base station identification signal, a global positioning system signal, and/or an LTE signal.

Example 88 is the wireless device of Example 87, wherein if the means for detecting determines that the geographic location does not correspond to one of the plurality of regulatory regions, the means for adjusting parameters is configured to implement the new transmission parameters in the transceiver based on whether the new transmission parameters comply with regulatory requirements for each of the plurality of regulatory regions.

Example 89 is the wireless device of any one of Examples 77 to 88, wherein the first frequency band is nearby the second frequency band.

Example 90 is the wireless device of any one of Examples 77 to 89, wherein the first frequency band is adjacent to the second frequency band.

Example 91 is the wireless device of any one of Examples 77 to 90, wherein the requested change is based on a trigger.

Example 92 is the wireless device of Example 91, wherein the trigger includes a means for determining that the interference condition exceeds a threshold interference level in the first frequency band.

Example 93 is the wireless device of either one of Example 91 or 92, wherein the trigger includes a means for receiving a request from an ITS communication device associated with the ITS radio signals to change the radio subsystem communication parameters.

Example 94 is the wireless device of any one of Examples 91 to 93, wherein the trigger is based on an a time period, where the time period is preferably every microsecond.

Example 95 is the wireless device of any one of Examples 91 to 94, wherein the trigger is based on a change in the geographic location of the wireless device.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

The invention claimed is:

1. A wireless device, comprising:
a transceiver configured to transmit and receive wireless signals in a first frequency band according to transmission parameters that depend on a geographic location of the wireless device;
a detector configured to determine an interference condition of the wireless signals on detected intelligent transport system (ITS) radio signals in a second frequency band, wherein the second frequency band is different from the first frequency band, wherein the interference condition comprises an interference level of the wireless signals on the detected ITS radio signals; and
a parameter adjustor configured to:
receive a request to adjust, based on the interference condition and based on occurrence of a trigger comprising a received ITS request to change the transmission parameters of the transceiver, the transmission parameters to new transmission parameters, wherein the new transmission parameters comprise a beamforming parameter of the transceiver that reduces the interference level of the wireless signals on the detected ITS radio signals; and
implement the new transmission parameters in the transceiver based on whether the new transmission parameters comply with a regulatory requirement of the geographic location.

2. The wireless device of claim 1, wherein the interference condition comprises an interference level of the wireless signals on the detected ITS radio signals.

3. The wireless device of claim 1, wherein the transceiver is further configured to transmit and receive the wireless signals according to general transmission parameters that are independent of the geographic location, wherein the parameter adjustor is configured to adjust the general transmission parameters without verifying whether the general transmission parameters comply with the regulatory requirement.

4. The wireless device of claim 1, wherein the new transmission parameters depend on a severity of the interference condition.

5. The wireless device of claim 1, wherein the new transmission parameters are configured to reduce the interference condition, wherein the new transmission parameters comprise at least one of an output power level of the transceiver, a beamforming parameter of the transceiver, a frequency channel of the transceiver, a transmission period of the transceiver, and/or a signal bandwidth of the transceiver.

6. The wireless device of claim 1, wherein the transmission parameters comprise radio frequency (RF) channels that are available for the transceiver to transmit the wireless signals, wherein the RF channels exclude frequencies that overlap with the detected ITS radio signals.

7. The wireless device of claim 1, further comprising a measurer configured to measure at an interval a power level of the detected ITS radio signals, wherein the parameter adjustor is configured to receive the request at the interval.

8. The wireless device of claim 1, further comprising a locator configured to determine, based on a received signal identifier received at the wireless device, whether the geographic location corresponds to one of a plurality of regulatory regions, each regulatory region having a corresponding regulatory requirement, wherein the received signal identifier comprises at least one of a base station identification signal, a global positioning system signal, and/or an LTE signal.

9. The wireless device of claim 8, wherein if the locator determines that the geographic location does not correspond to one of the plurality of regulatory regions, the parameter adjustor is configured to implement the new transmission parameters in the transceiver based on whether the new transmission parameters comply with regulatory requirements for each of the plurality of regulatory regions.

10. An apparatus, comprising:
a processor configured to
detect radio signals of an intelligent transport system (ITS) communication device in an environment of the apparatus;
determine radio communication parameters of the detected radio signals;
determine an interference condition based on whether radio subsystem communication parameters of a radio communication subsystem of the apparatus may interfere with the determined radio communication parameters, wherein the interference condition comprises an interference level of wireless signals of the radio communication subsystem on the detected radio signals;
request a change of the radio subsystem communication parameters to new transmission parameters, wherein the requested change is based on the interference condition and based on occurrence of a trigger comprising a received ITS request to change the transmission parameters of the radio communication subsystem, wherein the new transmission parameters comprise a beamforming parameter of the radio communication subsystem that reduces the interference level of wireless transmissions of the radio communication subsystem on the detected radio signals;
determine a geographic location of the apparatus; and
implement the requested change based on whether the requested change complies with a regulatory requirement of the determined geographic location.

11. The apparatus of claim 10, wherein the radio subsystem communication parameters comprise essential parameters and non-essential parameters, wherein the essential parameters depend on the determined geographic location of the apparatus.

12. The apparatus of claim 10, wherein the requested change of the radio subsystem communication parameters depends on a severity of the interference condition.

13. The apparatus of claim 10, wherein the requested change of the radio subsystem communication parameters comprises at least one of an output power level, a beamforming parameter, a frequency channel, a transmission period, and/or a signal bandwidth for the radio communication subsystem.

14. The apparatus of claim 10, wherein the radio subsystem communication parameters comprise radio frequency (RF) channels that are available for use by the radio communication subsystem, wherein the RF channels exclude RF channels that overlap with the detected radio signals of the ITS communication device.

15. The apparatus of claim 10, wherein the processor is further configured to measure over a bandwidth a power level of the detected radio signals, wherein the interference condition is based on the measured power level.

16. The apparatus of claim 10, wherein the processor is configured to determine the geographic location of the apparatus based on a received signal identifier received at the apparatus, wherein the received signal identifier comprises at least one of a base station identification signal, a global positioning system signal, and/or an LTE signal.

17. The apparatus of claim 10, wherein the radio subsystem communication parameters comprise sets of predefined transmission parameters for radio communication subsystem that comply with the regulatory requirement for a geographic region, wherein the processor is configured to implement the requested change by selecting from among the sets of predefined transmission parameters the set that corresponds to the geographic location of the apparatus.

18. A non-transitory computer readable medium, comprising instructions which, if executed, cause one or more processors to:
   detect radio signals of an intelligent transport system (ITS) communication device in an environment of a vehicle;
   determine radio communication parameters of the detected radio signals;
   determine an interference condition based on whether radio subsystem communication parameters of a radio communication subsystem of the vehicle may interfere with the determined radio communication parameters, wherein the interference condition comprises an interference level of the radio communication subsystem on the detected radio signals of the ITS communication device;
   receive a requested change of the radio subsystem communication parameters to new radio subsystem communication parameters, wherein the requested change is based on the interference condition and based on occurrence of a trigger comprising a received ITS request to change the radio subsystem communication parameters to new radio subsystem communication parameters, wherein the new radio subsystem communication parameters comprise a beamforming parameter of the radio communication subsystem that reduces the interference level of wireless transmissions of the radio communication subsystem on the detected radio signals; and
   implement the requested change based on whether the requested change complies with a regulatory requirement for a geographic location of the vehicle.

19. The non-transitory computer readable medium of claim 18, wherein the instructions further cause the one or more processors to determine the geographic location of the vehicle based on a received signal identifier, wherein the received signal identifier comprises at least one of a base station identification signal, a global positioning system signal, and/or an LTE signal.

* * * * *